United States Patent
Bachu et al.

(10) Patent No.: US 8,135,861 B1
(45) Date of Patent: Mar. 13, 2012

(54) BACKUP PROXY

(75) Inventors: Kiran Bachu, Sunnyvale, CA (US); Bob Lyon, Palo Alto, CA (US); Srinivasan Ramachandran, Palo Alto, CA (US)

(73) Assignee: EMC Corporation, Hopkinton, MA (US)

( * ) Notice: Subject to any disclaimer, the term of this patent is extended or adjusted under 35 U.S.C. 154(b) by 1090 days.

(21) Appl. No.: 10/960,447

(22) Filed: Oct. 6, 2004

(51) Int. Cl.
*G06F 15/16* (2006.01)
(52) U.S. Cl. ...................... 709/246; 709/232
(58) Field of Classification Search ............... 709/232, 709/246; 707/204
See application file for complete search history.

(56) References Cited

U.S. PATENT DOCUMENTS

| | | | | |
|---|---|---|---|---|
| 5,469,573 A * | 11/1995 | McGill et al. | | 717/127 |
| 5,673,322 A * | 9/1997 | Pepe et al. | | 705/52 |
| 5,751,997 A * | 5/1998 | Kullick et al. | | 711/162 |
| 6,253,248 B1 * | 6/2001 | Nakai et al. | | 709/237 |
| 6,263,454 B1 * | 7/2001 | Gold et al. | | 714/25 |
| 6,546,425 B1 * | 4/2003 | Hanson et al. | | 709/227 |
| 6,549,992 B1 * | 4/2003 | Armangau et al. | | 711/162 |
| 6,704,786 B1 * | 3/2004 | Gupta et al. | | 709/228 |
| 6,718,383 B1 * | 4/2004 | Hebert | | 709/224 |
| 6,810,409 B1 * | 10/2004 | Fry et al. | | 709/202 |
| 6,862,622 B2 * | 3/2005 | Jorgensen | | 709/226 |
| 6,901,493 B1 * | 5/2005 | Maffezzoni | | 711/162 |
| 6,920,501 B2 * | 7/2005 | Chu et al. | | 709/228 |
| 7,127,479 B2 * | 10/2006 | Tsaur et al. | | 707/204 |
| 7,895,334 B1 * | 2/2011 | Tu et al. | | 709/227 |
| 2001/0039586 A1 * | 11/2001 | Primak et al. | | 709/228 |
| 2002/0156921 A1 * | 10/2002 | Dutta et al. | | 709/246 |
| 2004/0019823 A1 * | 1/2004 | Gere | | 714/13 |
| 2004/0221101 A1 * | 11/2004 | Voorhees et al. | | 711/111 |
| 2005/0033988 A1 * | 2/2005 | Chandrashekhar et al. | | 713/201 |
| 2005/0086427 A1 * | 4/2005 | Fozard et al. | | 711/111 |
| 2005/0138091 A1 * | 6/2005 | Bono | | 707/205 |
| 2005/0165867 A1 * | 7/2005 | Barton et al. | | 707/204 |

OTHER PUBLICATIONS

Fielding et al. RFC 2616, "Hypertext Transfer Protocol—HTTP/1.1". Network Working Group, Jun. 1999. pp. 1-114.*

* cited by examiner

*Primary Examiner* — Christopher Biagini
(74) *Attorney, Agent, or Firm* — Van Pelt, Yi & James LLP

(57) ABSTRACT

According to some embodiments, a technique for storing data comprises receiving data from a data sender; wherein the data sender uses a first protocol; and sending the received data to a storage medium; wherein the received data is sent by a proxy, and wherein the proxy uses a second protocol.

15 Claims, 5 Drawing Sheets

BACKUP PROXY

FIELD OF THE INVENTION

The present invention relates generally to computer systems, more specifically to transferring data.

BACKGROUND OF THE INVENTION

Data backup systems can backup data from a variety of data servers. Some of these data servers may have proprietary data transfer protocol that can be used in a limited fashion. One example of such proprietary protocol is NDMP (Network Data Management Protocol), such as that used by NAS appliances. Another example is a third party data server that may use its own proprietary software that allows data to be transferred out and managed within its parameters. Data backup systems are typically not multi-protocol compliant and that is often a disadvantage when data server technology and data management protocols change. It would be desirable to backup data on these data servers in a manner that is upgradable, more reliable, and consistent with the data backup management of other data servers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
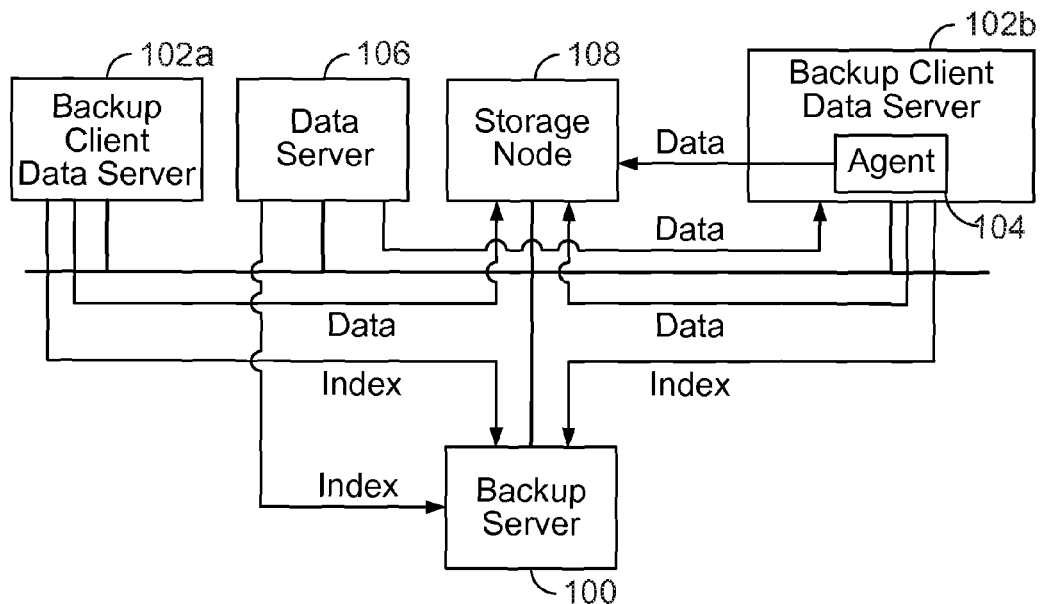
FIGS. 1A-1C are block diagrams of systems suitable for carrying out a method for a data server proxy according to some embodiments.

FIG. 1A is a block diagram of a system suitable for carrying out the invention according to some embodiments. In this example, a backup server 100 is shown to be coupled with backup client data servers 102A-102B, a data server 106, and a storage node 108. An example of the back server 100 is Networker Server by Legato, Inc., a division of EMC. The backup client data servers 102A-102B can be data servers that have software that is designed to work in conjunction with the backup server 100. For example, backup client data servers 102A-102B may have Networker client software installed in them, which is designed to work with Networker Server, an example of the backup server 100. Data server 106 may be a data server with its own proprietary data management software, such as a NAS appliance using NDNP for data management, or a third party data server, such as an IBM data server that has its own proprietary data management software that is not specifically designed to work with all the functionality and reliability of backup server 100. This storage node 108 can be a host to which devices attach or, as used herein for simplicity, can be the storage medium itself. Examples of devices that can attach to the storage node 108 includes any storage medium such as a hard disk, jukebox, or a tape drive.

Backup client data server 102B is also shown to include a proxy 104. The proxy 104 can be spawned anywhere in the system of FIG. 1, but is shown to be included in the backup client data server 102B for illustrative purposes. During a backup session, the backup client data servers 102A-102B send their backup data to storage node 108 and information associated with the data, herein referred to as index, to backup server 100. According to some embodiments the data server 106 sends its data to the proxy 104, for example, via TCP/IP, and also sends the index of the backup data to the backup server 100. The proxy 104 sends the received backup data to the storage node 108 according to its data management protocol which offers the same functionality as the backup data servers 102A-102B's functionality.

Figure 1B:
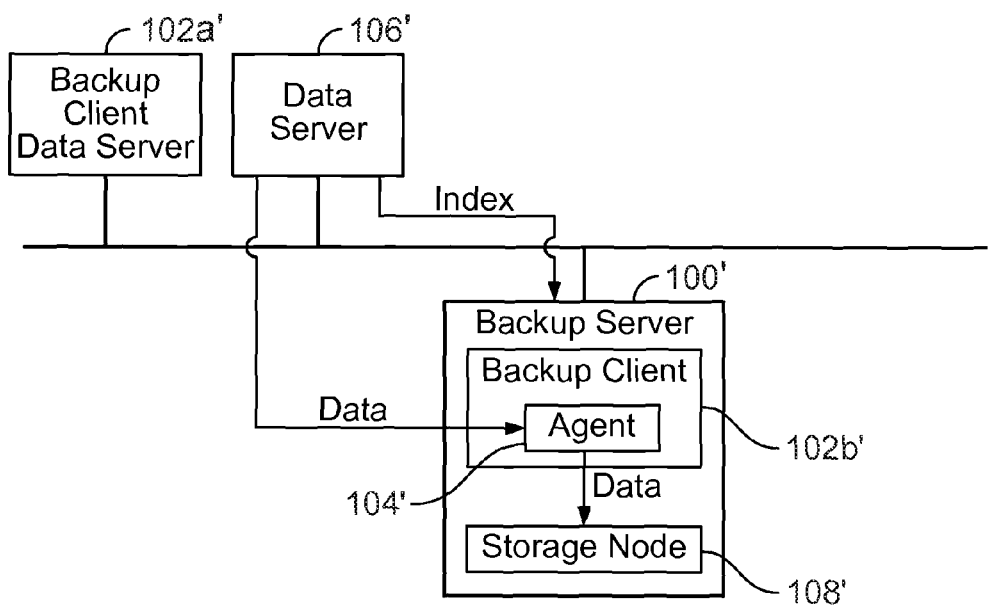

FIG. 1B is a block diagram of a system suitable for carrying out the invention according to some embodiments. In this embodiment, the storage node 108', backup client 102b', and backup server 100' can be in the same host. In this example, backup server 100' could have devices, such as a storage medium, attached, and agent 104' can be invoked on the backup server 100'. The data flow from data server 106' goes to agent 104' that is in backup server 100' and then from agent 104' to storage node 108', both of which would be in the backup server box 100'.

Figure 1C:
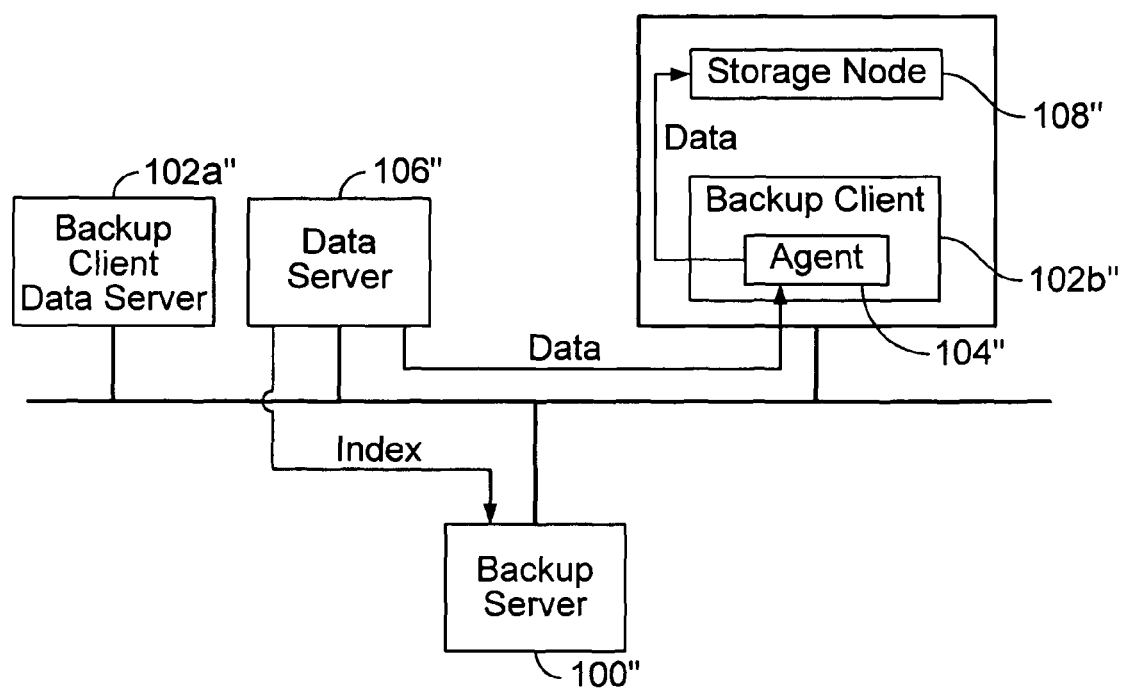

FIG. 1C is a block diagram of a system suitable for carrying out the invention according to some embodiments. In this embodiment, storage node 108", backup client 102b", and agent 104" are in the same host. In this example, the data flow from data server 106" goes to agent 104", and then from agent 104" to storage node 108".

Figure 2:
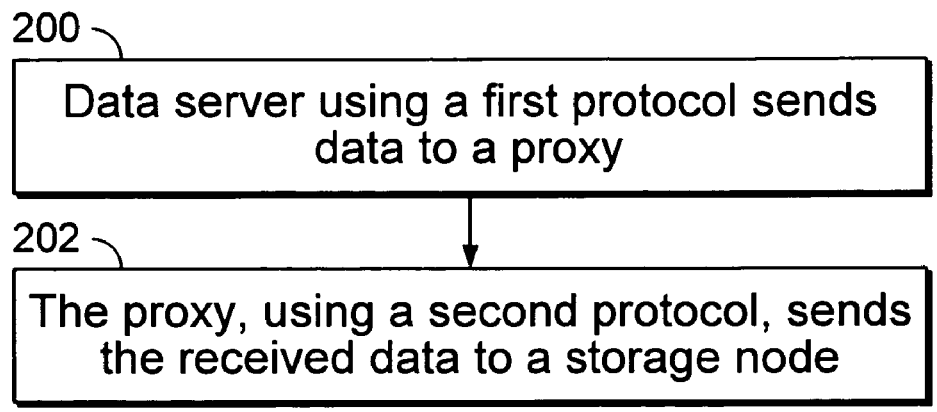
FIG. 2 is a flow diagram of a method for a data server proxy according to some embodiments.

FIG. 2 is a flow diagram of a method for a data server proxy according to some embodiments. In this example, a data server using a first protocol, such as NDMP, sends data to a proxy (200). The data can be sent via TCP/IP. The proxy, using a second protocol, then sends the received data to a storage node (202). The second protocol can add functionalities that were not provided by the first protocol. One example of the second protocol is the Networker protocol by Legato, Inc., a division of EMC.

The second protocol may allow additional functionality not provided in the first protocol. For example, the second protocol may upgrade faster than the first protocol and using the proxy can allow the data server to claim the benefit of the additional functionality allowed in the upgraded protocol. Accordingly, the data server's functionality can be upgraded via the use of the proxy. Another example of additional functionality is that the second protocol may have built in reliability that is not available in the first protocol. For example, the second protocol may have levels of reliability such that if one data transport method fails then the next possible way of transporting data is automatically employed. For example, the second protocol may have a first reliability level using LAN, a second level using ISAVE, and a third level using direct file access (DFA). In contrast, the data server sending the data to the proxy may be using the first protocol which does not currently use this multilevel built-in reliability. Further examples of additional functionality include tape alerts and the use of common device interface (CDI). Likewise, NDMP currently does not offer functionality such as multiplexing to tape or backup to disk. These functionalities can be offered in the second protocol used by the proxy to send the data to the storage node. Functionality is used herein to include any feature that can used in data management, such as reliability features, connectivity features, and any other feature that might be used. Although NDMP is used as an example for the first protocol, the proxy can be used with any data server that might benefit from additional functionalities.

Figure 3:
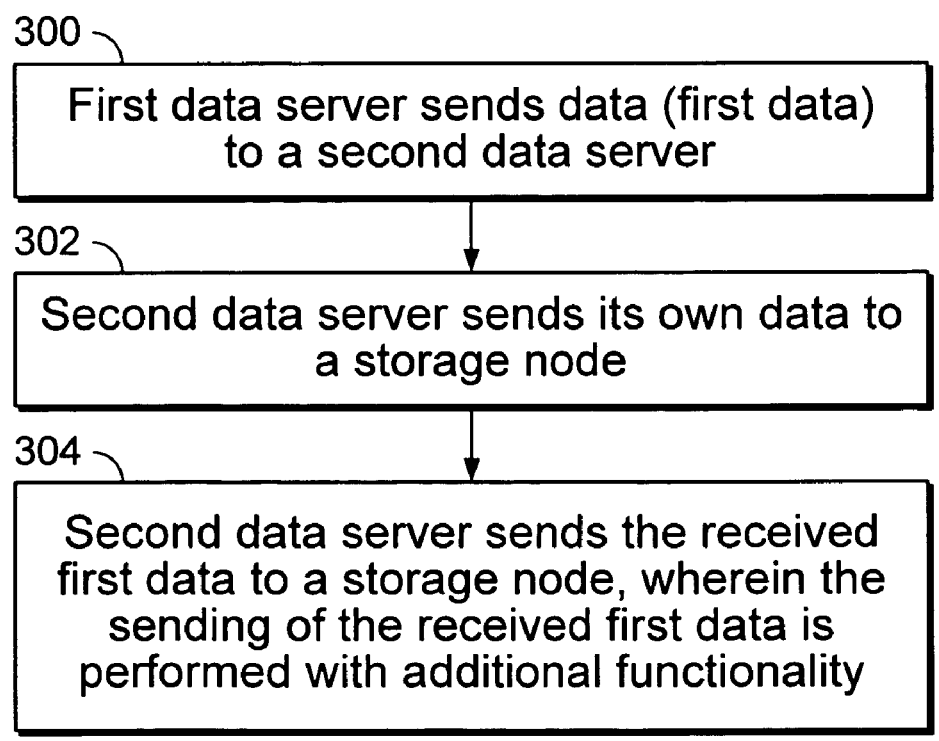
FIG. 3 is another flow diagram of a method for using a data server proxy according to some embodiments.

FIG. 3 is another flow diagram of a method for using a data server proxy according to some embodiments. In this example, a first data server sends data, herein referred to as first data, to a second data server (300). The second data server optionally sends its own data to a storage node (302), and also sends the received first data to a storage node, wherein the sending of the received first data is performed with additional functionality (304). For example, a NAS appliance sends data to a backup client data server. The backup client data server sends its own data to be backed up to a storage node. The second data server also hosts a proxy which sends the received first data to a storage node, wherein the sending of the first data is performed with functionality not offered by the NAS appliance.

Figure 4:
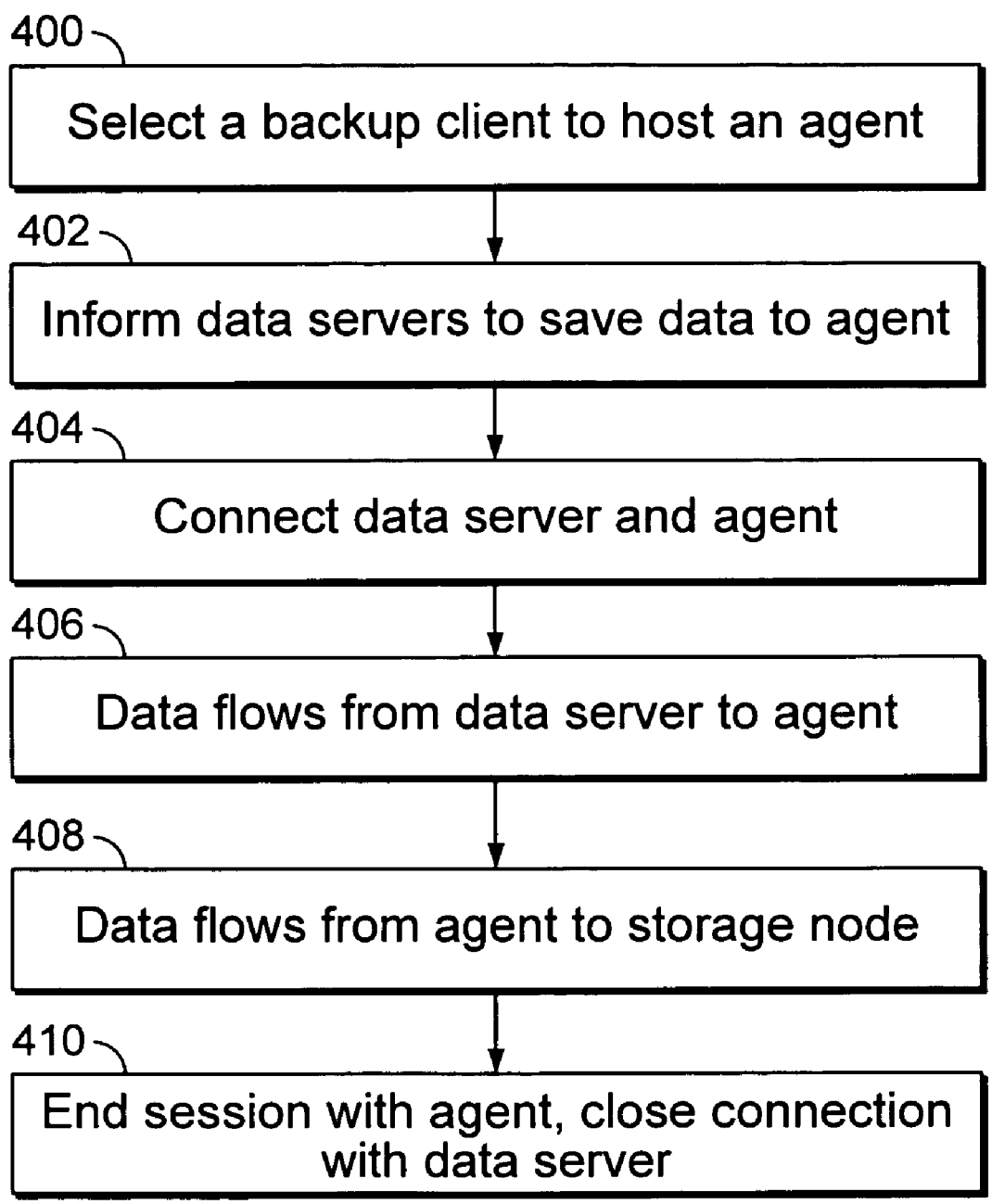
FIG. 4 is another flow diagram of a method for using a data server proxy according to some embodiments.

FIG. 4 is another flow diagram of a method for using a data server proxy according to some embodiments. In this example, a backup client is selected to host a proxy (400). Selected data servers are informed to save data to the proxy (402). One example of selected data servers would be data servers using NDMP protocol. The selected data server and proxy are connected (404). The data flows from the data server to the proxy (406). The data then flows from the proxy to the storage node (408). The session with the proxy is then ended, and the connection with the data server is closed (410) in this example.

In this example, the data server behaves as though the proxy was the storage device, the backup server behaves as though the proxy was its client, and the storage device behaves as though the proxy was its client.

Figure 5:
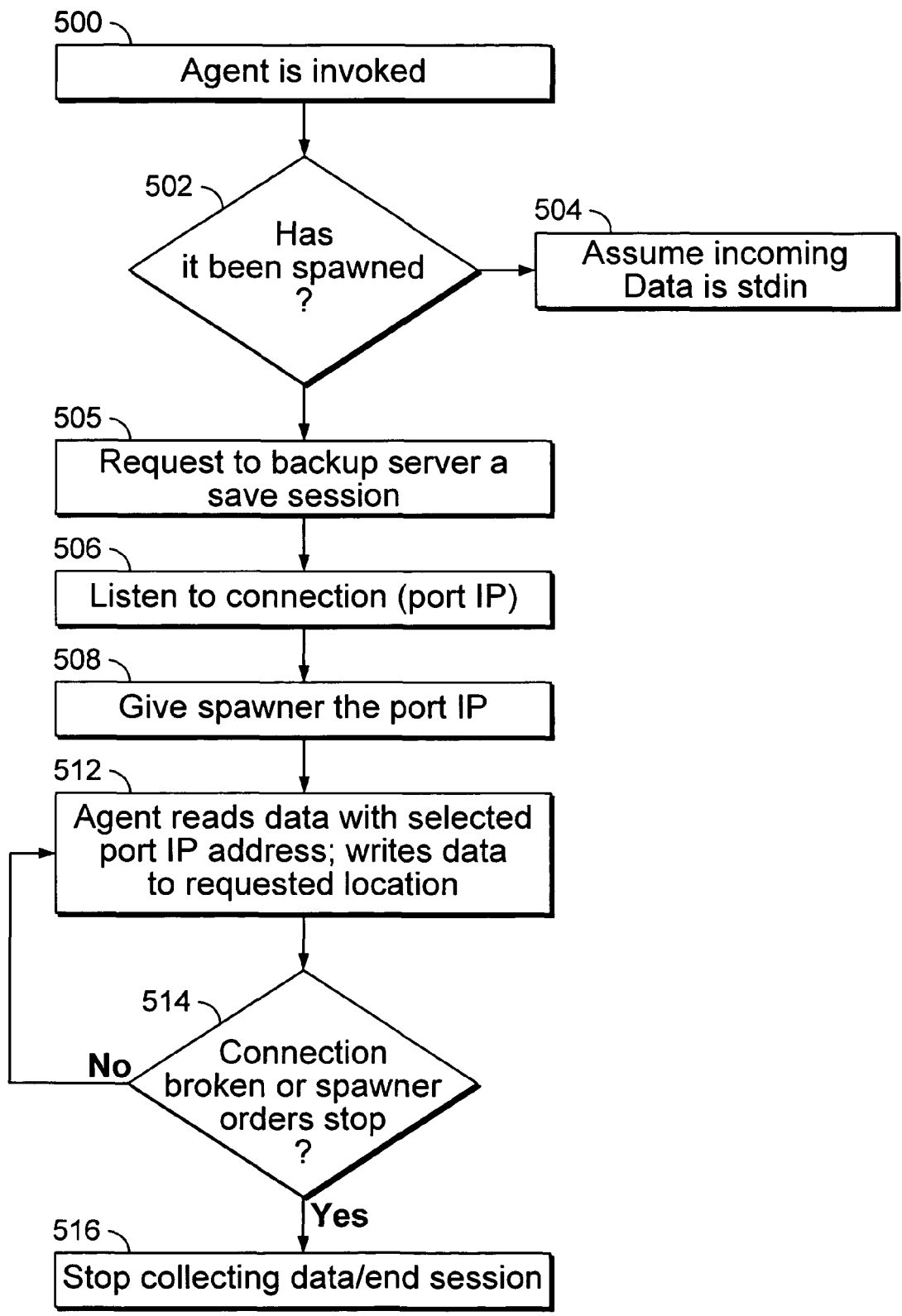
FIG. 5 is a flow diagram of a method for proxying data according to some embodiments.

FIG. 5 is a flow diagram of a method for proxying data according to some embodiments. In this example, a proxy is invoked (500). An example of invoking a proxy is having the backup server instruct a backup client data server to spawn a proxy. It is then determined whether the proxy has been spawned (502). A proxy can invoked through other means rather than spawning, for other reasons. For example, a proxy can be invoked through a command line indicator. If the proxy has not been spawned (502), then assume incoming data to be "stdin" (504). "Stdin" is a standard input and the proxy may simply read the data from "Stdin" and follow instructions for where to send the data, such as to the storage node/device.

If the proxy has been spawned (502), a request for a save session is sent to the backup server (505). It then listens to the connection and finds a port IP (506) in this example. The spawner of the proxy is then given the port IP (508). The proxy receives data through the selected port IP address and writes the data to a requested location, such as a specific storage node or device. (512). For example, the proxy receives data from a data server and writes the data to a particular storage device. It is determined whether the connection is broken, or whether the spawner has ordered the proxy to stop (514). If either the connection is broken or the proxy receives orders to stop, then it stops collecting data and the backup session ends (516).

The proxy can receive a data stream from any source and can write the data to any location requested of it. Accordingly, the proxy can be used in the relaying of any data sent to it via a first protocol and sending out using a second protocol.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for storing data comprising:
   invoking a proxy at a data server, either through an instruction to spawn the proxy received from a remote computer or through a command line indicator, wherein the proxy is configured to receive and send backup data;
   determining whether or not the proxy has been spawned;
   when it is determined that the proxy has not been spawned:
      assuming incoming data is a standard input, and
      receiving, by the proxy, the backup data from the standard input;
   when it is determined that the proxy has been spawned:
      sending a request for a save session to a backup server,
      listening to a connection for an IP address and a port,
      providing the IP address and the port to proxy spawner software, and
      receiving, by the proxy, the backup data via the IP address and the port;
   sending the backup data from a data sender software process to a the proxy over a first backup protocol;
   sending the backup data from the proxy to a storage medium over a second backup protocol; and
   sending index data of the backup data from the data sender software process to the backup server by a route independent of the data server and the proxy;
   wherein the second backup protocol provides additional functionality that is not provided in the first backup protocol, the additional functionality comprising: multiple levels of reliability such that if one data transport method fails then a next possible way of transporting data is automatically employed, allowing for tape alerts, and multiplexing to tape.

2. The method of claim 1, wherein the second backup protocol is upgradable.

3. The method of claim 1, wherein the storage medium is a disk.

4. The method of claim 1, wherein the first backup protocol is network data management protocol (NDMP).

5. The method of claim 1, wherein the second backup protocol includes the use of common device interface.

6. The method of claim 1, wherein the second backup protocol includes connectivity features.

7. A system for storing data comprising:
   at least one processor configured to invoke a proxy at a data server, either through an instruction to spawn the proxy received from a remote computer or through a command line indicator, wherein the proxy is configured to receive and send backup data;

determine whether or not the proxy has been spawned;

when it is determined that the proxy has not been spawned:
assume incoming data is a standard input, and
receive, by the proxy, the backup data from the standard input;

when it is determined that the proxy has been spawned:
send a request for a save session to a backup server,
listen to a connection for an IP address and a port,
provide the IP address and the port to proxy spawner software and
receive, by the proxy, the backup data via the IP address and the port;

send the backup data from a data sender software process to the proxy over a first backup protocol;

send the backup data from the proxy to a storage medium over a second backup protocol; and send index data of the backup data from the data sender software process to the backup server by a route independent of the data server and the proxy;

wherein the second backup protocol provides additional functionality that is not provided in the first backup protocol, the additional functionality comprising: multiple levels of reliability such that if one data transport method fails then a next possible way of transporting data is automatically employed, allowing for tape alerts, and multiplexing to tape;
and a memory coupled with the processor, wherein the memory provides the processor with instructions.

8. The system of claim 7, wherein the second backup protocol is upgradable.

9. The system of claim 7, wherein the first backup protocol is network data management protocol (NDMP).

10. The system of claim 7, wherein the second backup protocol includes the use of common device interface.

11. The system of claim 7, wherein the second backup protocol includes connectivity features.

12. A computer program product for storing data, the computer program product being embodied in a non-transitory computer readable storage medium and comprising computer instructions for:

invoking a proxy at a data server, either through an instruction to spawn the proxy received from a remote computer or through a command line indicator, wherein the proxy is configured to receive and send backup data;

determining whether or not the proxy has been spawned;

when it is determined that the proxy has not been spawned:
assuming incoming data is a standard input, and
receiving, by the proxy, the backup data from the standard input;

when it is determined that the proxy has been spawned:
sending a request for a save session to a backup server,
listening to a connection for an IP address and a port,
providing the IP address and the port to proxy spawner software, and
receiving, by the proxy, the backup data via the IP address and the port;

sending the backup data from a data sender software process to the proxy over a first backup protocol;

sending the backup data from the proxy to a storage medium over a second backup protocol; and sending index data of the backup data from the data sender software process to the backup server by a route independent of the data server and the proxy;

wherein the second backup protocol provides additional functionality that is not provided in the first backup protocol, the additional functionality comprising: multiple levels of reliability such that if one data transport method fails then a next possible way of transporting data is automatically employed, allowing for tape alerts, and multiplexing to tape.

13. The computer program product of claim 12, wherein the second backup protocol is upgradable.

14. The computer program product of claim 12, wherein the first backup protocol is network data management protocol (NDMP).

15. The computer program product of claim 12, wherein the second backup protocol includes connectivity features.

\* \* \* \* \*